March 3, 1970    M. McALLISTER ETAL    3,498,156
COMBINED ENGINE THROTTLE AND TRANSMISSION KICK-DOWN
CONTROL FOR AN AUTOMOTIVE VEHICLE DRIVELINE
Filed April 22, 1968    5 Sheets-Sheet 2
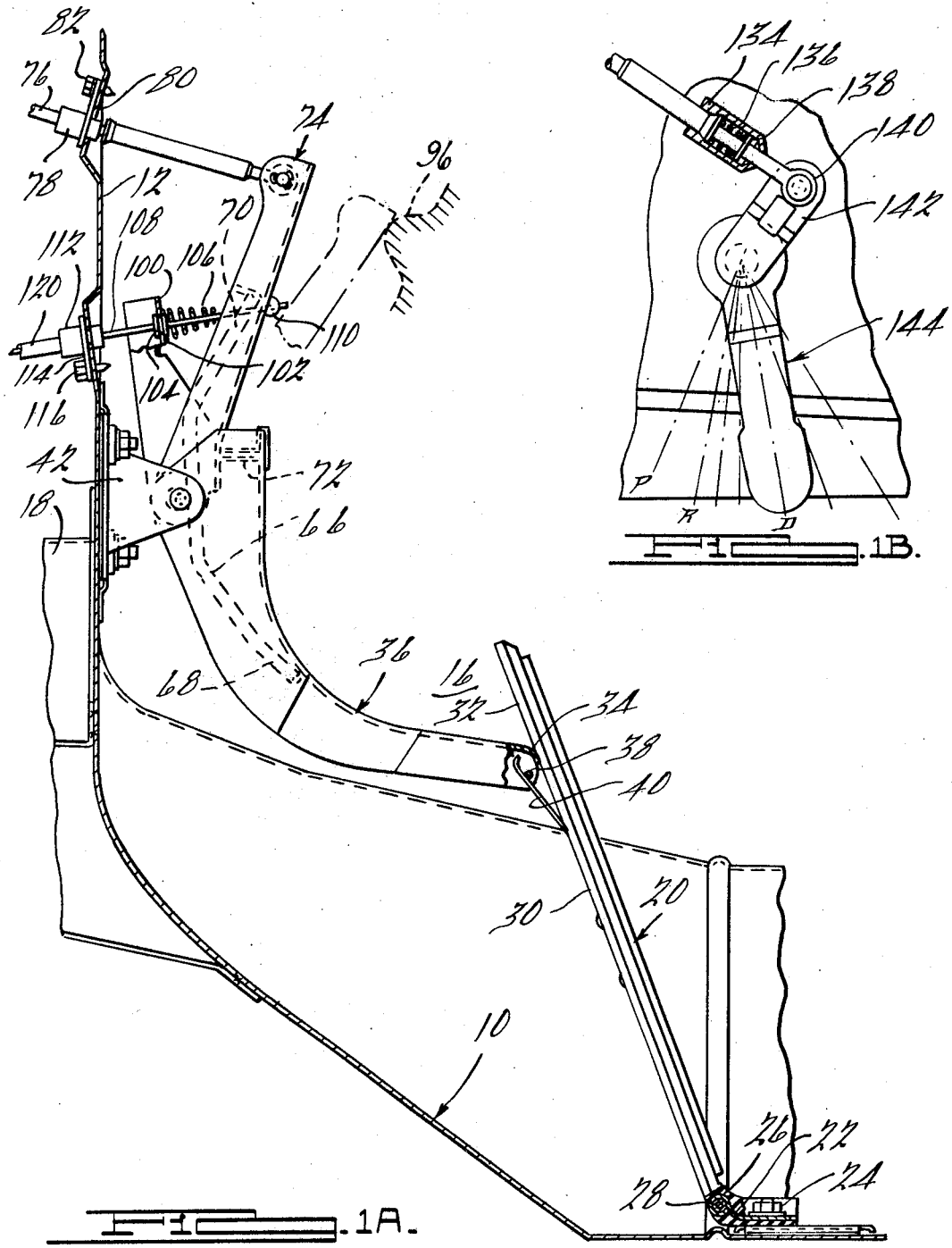
INVENTORS:
Morris McAllister
Robert C. Gardner
BY
ATTORNEYS.

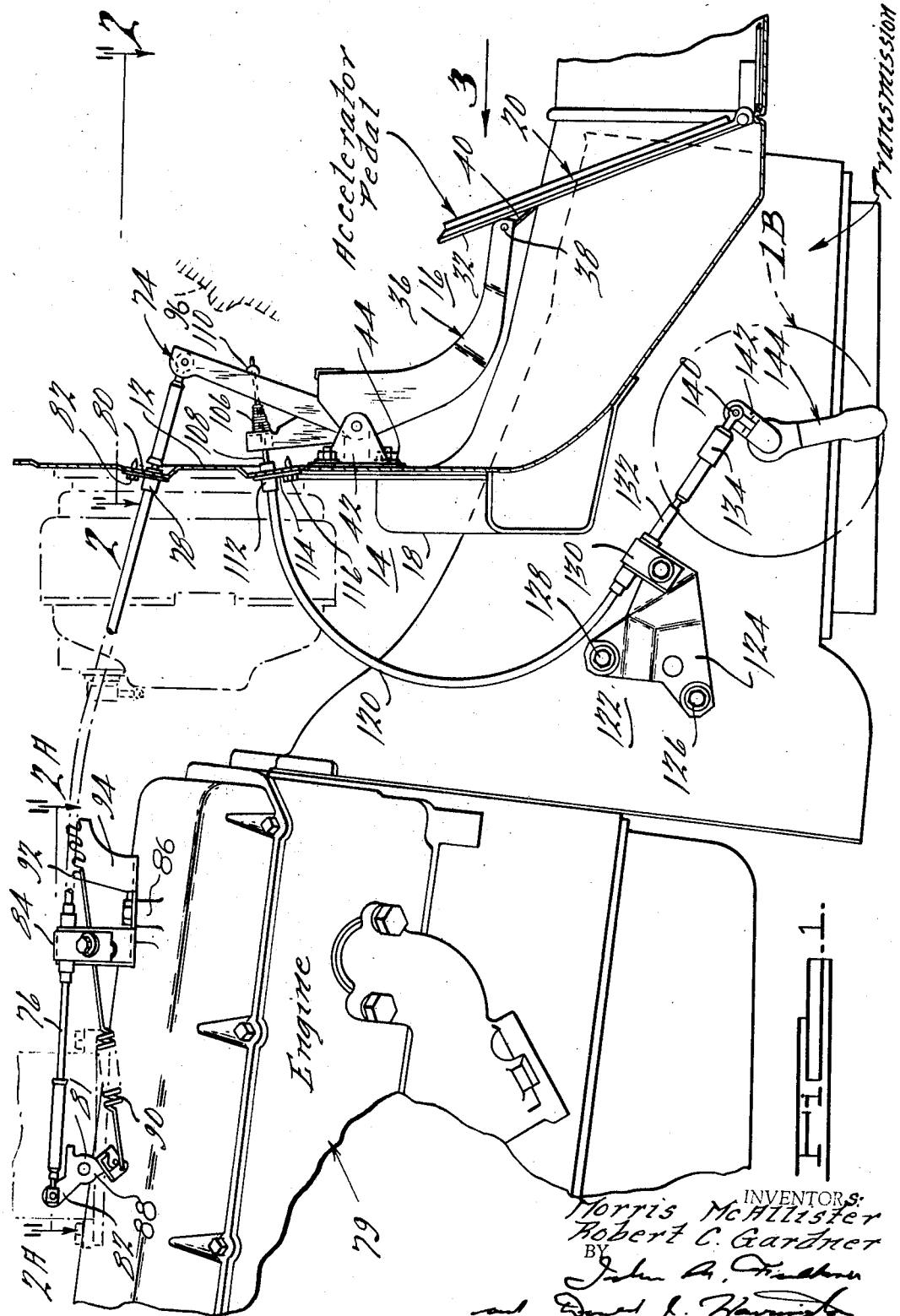

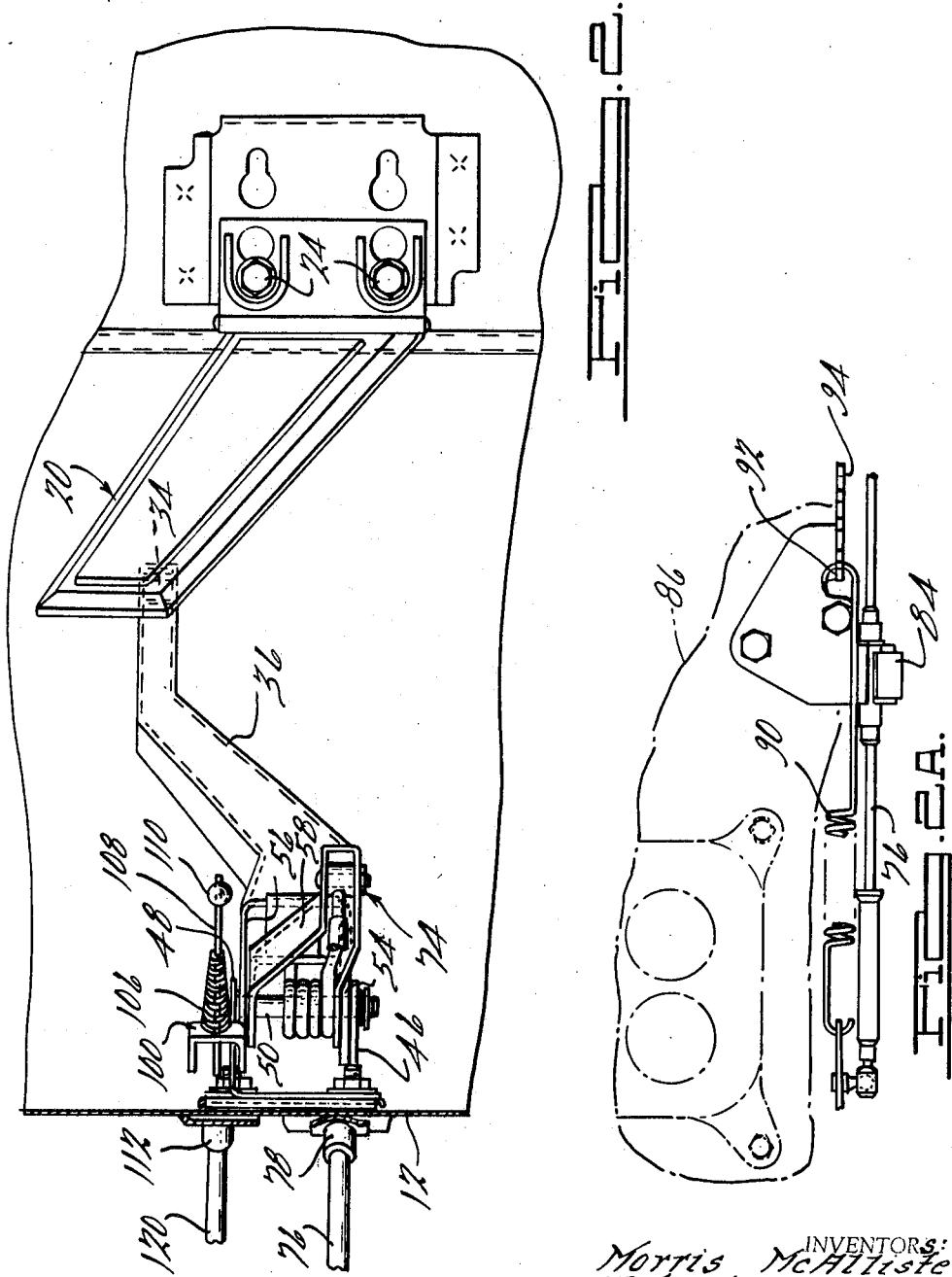

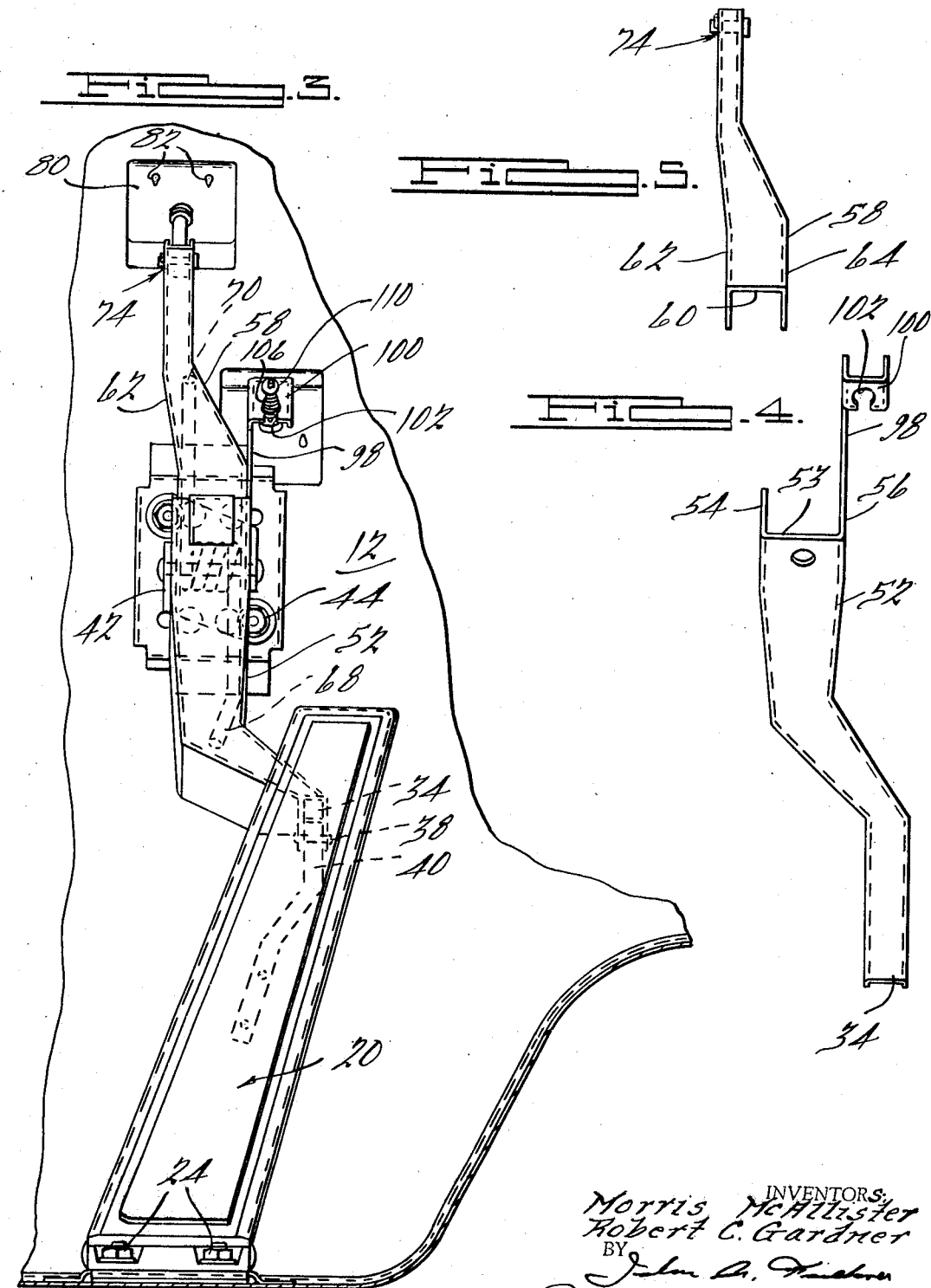

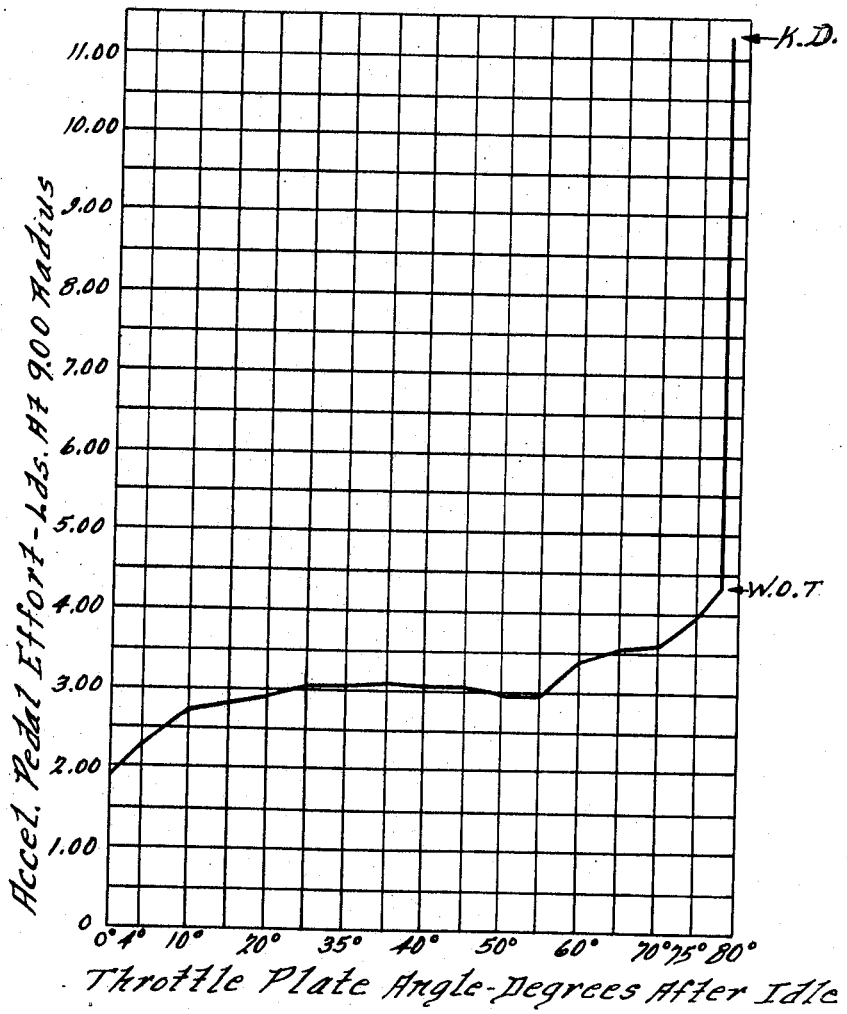

United States Patent Office 3,498,156
Patented Mar. 3, 1970

3,498,156
COMBINED ENGINE THROTTLE AND TRANSMISSION KICK-DOWN CONTROL FOR AN AUTOMOTIVE VEHICLE DRIVELINE
Morris McAllister, Plymouth Township, and Robert C. Gardner, Romulus, Mich., assignors to Ford Motor Company, Dearborn, Mich., a corporation of Delaware
Filed Apr. 22, 1968, Ser. No. 722,916
Int. Cl. G05g 9/04
U.S. Cl. 74—879
8 Claims

ABSTRACT OF THE DISCLOSURE

A driver controlled linkage mechanism in an automotive vehicle driveline for controlling the engine carburetor throttle and the ratio downshift control elements for a multiple-ratio, automatic power transmission, including a bipartite lever connected operatively to the vehicle accelerator pedal, one part of the lever being joined to the other through a preloaded spring connection, the separate parts being connected respectively to the engine throttle and to the transmission downshift control whereby separate operating limits are established for the displacement of each lever part.

GENERAL DESCRIPTION OF THE INVENTION

Our invention relates generally to an automotive vehicle driveline having a throttle-controlled, internal combustion engine and a multiple-ratio, automatic, power transmission mechanism for delivering torque from the engine to the vehicle drive shaft. The linkage mechanism is under the control of the vehicle operator as he advances and retracts the vehicle accelerator pedal.

It is usual practice to provide a direct, mechanical connection between the engine throttle valve and a throttle lever assembly, the latter being connected mechanically to the vehicle accelerator pedal. This same lever assembly is connected through a suitable motion transmitting linkage to a downshift control element on the transmission housing. When it is adjusted to the downshift position, the downshift control element overrules the automatic ratio changing tendencies of the control valve system. To force a downshift from one transmission ratio to a lower, under-drive speed ratio, it is common practice to adjust the linkage so that a forced downshift in the transmission will occur only when the engine throttle is advanced to a wide-open throttle position or to a position beyond the wide-open throttle position.

The downshift point is determined, therefore, by the engine throttle opening. To provide a proper relationship between the accelerator movement or throttle opening and the downshift control element, the linkage mechanism for the downshift control, as well as the engine throttle linkage, must be adjusted carefully. If the system is maladjusted and the accelerator pedal is advanced to the kickdown position, it is possible to overstress the throttle linkage elements thereby causing failure of the linkage system and miscalibration of the transmission upshift points. Misadjustments of the linkage system may result also, of course, in erroneous downshift points, causing a downshift to occur either too soon or too late with respect to the wide open engine throttle position.

Our improved linkage system overcomes these disadvantages by using a bipartite lever assembly that is mounted pivotly on a fixed portion of the vehicle chassis, one part of the linkage assembly being connected mechanically to the vehicle accelerator pedal and the other part being connected to the vehicle engine throttle linkage. The two parts of the lever assembly are connected together by means of a lost motion spring arrangement so that they will move in unison during normal engine carburetor throttle adjustments within prescribed limits. Upon movement of the engine throttle beyond a wide open throttle position, the other lever assembly part will engage a fixed stop carried by the vehicle chassis thereby preventing further movement of the engine throttle. Continued movement of the one lever assembly part may take place, however, as the lost motion spring connection begins to yield under the increased effort exerted by the vehicle operator on the accelerator pedal. This one assembly part is connected mechanically to the automatic power transmission forced downshift control.

In the embodiment disclosed in this specification, the downshift control is connected to the one lever assembly part by an actuator cable, one end of which is connected to the downshift control element and the other end of which is connected by means of an overload spring to the one lever assembly part. The cable is anchored to the transmission housing, and the downshift point is determined solely by the distance between the point at which the cable is anchored and the operating end of the cable which is connected to the downshift control. Vehicle assembly tolerances then will not affect the downshift point. Adjustments in the calibration of the engine carburetor throttle will not affect the downshift point, and conversely, adjustments of the downshift element will not affect engine carburetor throttle movement.

BRIEF DESCRIPTION OF THE FIGURES OF THE DRAWINGS

FIGURE 1 shows an assembly view of our improved linkage assembly in an automotive vehicle chassis.

FIGURE 1A is a view similar to FIGURE 1 with parts shown enlarged.

FIGURE 1B is an enlarged detail of the lever shown in view 1B of FIGURE 1.

FIGURE 2 is a plan view of the structure of FIGURE 1 as seen from the plane of section line 2—2 of FIGURE 1.

FIGURE 2A is a plan view of the structure of FIGURE 1 as seen from the plane of section line 2A—2A of FIGURE 1.

FIGURE 3 is a side elevation view of the assembly of FIGURE 1 as seen from the plane of section line 3—3 of FIGURE 1.

FIGURE 4 is a detail view of one part of the lever assembly shown in FIGURE 1.

FIGURE 5 is a detail view of a second part of the lever assembly shown in FIGURE 1.

FIGURE 6 is a chart showing the accelerator pedal effort variation with changes in engine throttle angle.

PARTICULAR DESCRIPTION OF THE INVENTION

In FIGURE 1 numeral 10 designates the floor of the sheet metal body for an automotive vehicle. The body includes a forward wall 12 which operates the vehicle engine compartment 14 from the passenger compartment 16. Reinforcing channel members 18 are secured to the engine compartment side of the wall 12 to provide rigidity.

An accelerator pedal 20 is mounted pivotly on a bracket 22 which in turn is secured by bolts 24 to the floor sheet metal 10. The bracket 22 is formed with an eyelet 26 which receives a pivot pin 28. The pin is held at its ends within the lower end of the pedal 20.

A sheet metal strip 30 is screwed or otherwise connected to the lower side of the pedal 20. The upper portion 32 of the strip engages one end 34 of a lever assembly identified generally by reference character 36. The pin 38 carried by the end 34 is engaged by an offset part of the sheet metal strip 30 as shown at 40, thereby causing the pedal 20 to engage normally the end 34.

A pivot bracket 42 is bolted by bolts 44 to the forward wall 12. This bracket includes two spaced wings 46 and 48 which are provided with aligned openings through which is received a pin 50. Pivotly carried by the pin 50 is a lower part 52 of the lever assembly 36. Part 52 is illustrated best in FIGURE 4. It includes a base side 53 and two side flanges 54 and 56. These flanges 54 and 56 are provided with openings to receive the pin 50. The end of the part 52 that is remote from the pin 50 may be offset, as shown in FIGURE 4; and it is this end, which was previously identified by reference character 34, that is engaged by the pedal 20.

In FIGURE 5 we have shown the upper part 58 of the lever assembly 36. It includes a base side 60 and two side flanges 62 and 64. These side flanges nest within the flanges 54 and 56 of the part 52. The flanges 62 and 64 are formed with side openings that receive pin 50. Thus the part 58 is pivotly mounted on the bracket 42 for oscillation about a pivotal axis that is common to the part 52.

A preload spring 66 has multiple coils that surround the pin 50. One end 68 of the spring 66 is received within the flanges 54 and 56 of the part 52 and is adapted to engage the base side 53. Similarly, spring 66 is provided with an end 70 which is received within the flanges 62 and 64 of the part 58. The end 70 is adapted to engage the base side 60 of the part 58. The spring exerts a preload on the parts 58 and 52. After the parts are assembled with the spring, a spacer element 72 is inserted between the upper end of part 52 and the lower end of part 58. As seen in FIGURE 1, the spacer element 72 limits the relative displacement of part 58 with respect to part 52 and allows the parts to move in unison about the axis of the pin 50 as the accelerator pedal 20 is advanced and retracted.

The uppermost end of the part 52 of the lever assembly 36 is pinned at 74 to a cable 76, the cable 76 being provided with an eyelet to provide a pin connection with the end of the part 52. Cable 76 is slidably received within a collar 78 which is held fast by means of a bracket 80. This in turn is secured by bolts 82 to the wall 12.

The vehicle engine is designated generally by reference character 79. It includes an engine carburetor throttle-adjusting lever 81 which is connected to a pivot shaft for a carburetor throttle blade. One arm 82 of the lever 81 is pinned to one end of the cable 76. A cable supporting bracket 84 is secured by bolts to the top of the intake manifold 86 for the engine.

Another arm 88 of the lever 81 has secured thereto a tension spring 90, one end of the spring being anchored on one of several teeth 92 carried by anchor member 94. The anchor member can be secured also to the intake manifold 86. The spring 90 normally tends to move the throttle lever 81 to a closed throttle position.

As the lever assembly 36 is pivoted by the accelerator pedal 20 in a clockwise direction, as viewed in FIGURE 1, the spring 90 is caused to yield. This movement is accompanied by opening of the throttle.

The lower part 52 of the lever assembly 36 is provided with an extension 98, the radially outward part forming a spring retainer 100. The extension may form a continuation of the flange 56 and may be coplanar therewith.

The retainer 100 is formed with an opening 102 through which is received a grommet or spring anchor 104. One coil of a conical spring 106 is retained in place by the grommet 104 as indicated in FIGURE 1. A kick-down cable 108 extends through the opening 102 and through the spring 106. The end of the cable 108 is provided with a bead or anchor element 110. This may be formed of glass, although other types of anchors may be used as well. The cable 108 is trained through a collar 112 secured by means of a bracket 114 to the wall 12. The bracket 114 is held in place by bolts 116.

The cable 108 extends through a cable housing 120 to the transmission which is indicated generally by reference character 122. Bolted to one side of the housing for transmission 122 is a supporting bracket 124. The securing bolts for the bracket 124 is designated by reference characters 126 and 128. Carried by bracket 124 is an eyelet 130, which receives a collar 132. The cable housing 120 is connected directly to the collar 132.

The collar 132 supports a spring housing 134 in which is positioned a transmission kick-down spring 136. The spring is seated on a shoulder formed within the housing 134. Its other end is seated on a washer 138 secured directly to the cable 108.

The cable is connected by means of an eyelet 140 to one arm 142 of a kick-down lever 144. This lever forms a part of the automatic control valve system and is effective to move a kick-down valve in the valve system to a position which will cause the valve system to condition the transmission for an underdrive ratio, thus overruling the normal ratio-controlling tendencies of the valve system.

The bead or anchor element 110 normally is displaced from the conical spring 106. It moves into engagement with the top of the spring 106, however, when the accelerator pedal is moved to a position corresponding to the wide open engine throttle position. At that time, as described previously, the upper end of the part 58 of the lever assembly 36 reaches the wide open throttle position. If the accelerator pedal continues its motion, the spring 106 will become compressed. After a predetermined displacement of the spring (for example, .075 inch), the kick-down spring 136 begins to yield. This will cause the downshift control lever to move to the forced downshift position. If the operator continues to move the accelerator pedal 20 to the overload position, the system components are not overstressed since this merely results in a further flexure of the springs 66 and 106. The yielding of the spring 106 provides a detent feel which allows the operator to sense the point in the travel of the accelerator pedal at which a forced downshift will be initiated. Spring 136 merely functions as a return spring for the cable and does not influence detent feel.

To control the downshift point it merely is necessary to control the tolerance between the pivot connection of the cable 108 to the arm 142 and the connection between the bracket 124 and the transmission housing. This is a dimension that easily can be controlled during manufacturing. No further adjustments are required when the transmission vehicle chassis and the body structure are assembled. Thus variations in the downshift point due to assembly tolerances and normal assembly dimensional inaccuracies are eliminated.

In addition to the foregoing advantages, it is not possible with the improved system described in this specification to overload the throttle linkage system. The maximum force that can be imparted to the throttle linkage through throttle cable 76 is that value that is achieved when the throttle reaches the wide open position. Although further motion is possible as the accelerator pedal 20 is pressed, no further pivoting motion of the part 58 takes place.

With this arrangement it is possible also to correlate precisely the pedal effort that is desired for any given installation with the throttle valve opening. A typical value for throttle effort in an automotive vehicle currently in production is illustrated in FIGURE 6. The maximum pedal effort occurs, as illustrated in FIGURE 6, at the point at which the wide open throttle setting is reached. The pedal effort change increases rapidly at that time because of the deflection of the preloaded spring 66 and the deflection of the springs 106 and 136. It is at that time that the kick-down occurs.

The lever assembly 36 is installed initially in the vehicle passenger compartment before the spacer 72 is installed. At that time the parts 58 and 52 can move freely with respect to each other. As the spacer 72 is installed in FIGURE 1, the spring 66 becomes preloaded. Thereafter the preload of the spring causes the parts 58 and 52 of the lever assembly 36 to move in unison.

This action continues throughout the normal limits of the engine carburetor throttle adjustment. It is only after the maximum, wide-open throttle setting is reached that displacement of one part occurs with respect to the other.

It is desirable to cause the wide open throttle position to occur slightly before the wide open setting is reached. This can readily be accomplished simply by changing the distance between the eyelet 140 and the mounting bolts 126 and 128 for the bracket 124. No further adjustments are needed during the assembly of the body, the chassis and the transmission, and there is no opportunity for this system to lose its calibration once the adjustment is made.

Having thus described a preferred form of our invention, what we claim and desire to secure by U.S. Letters Patent is:

1. In an automotive vehicle having a multiple-ratio, automatic, power transmission mechanism and an internal combustion, throttle-controlled engine, a driver operated accelerator pedal, a bipartite lever assembly pivoted at a location intermediate its ends on a fixed portion of said vehicle, each part of said lever assembly being adapted for rotation about a common axis, preloaded spring means normally urging the parts of said lever assembly into mutual engagement whereby said parts are adapted to oscillate in unison throughout a predetermined range of adjusted positions, one end of one part of said lever assembly being engaged by said accelerator pedal whereby said lever assembly oscillates in one direction as said pedal is depressed, a flexible cable connecting the other part of said lever assembly with engine throttle position-controlling elements, and a separate cable independent of said first named cable connecting the said one part of said lever assembly and ratio downshift controlling elements of said transmission.

2. The combination as set forth in claim 1 wherein the cable connection between said one part of the lever assembly and said ratio-controlling elements of said transmission include a lost motion connection between said ratio-controlling elements and said one part of said lever assembly through said cable connection.

3. The combination as set forth in claim 1 including a yieldable spring connection between one end of said last-named separate cable and said ratio-controlling elements, an anchor element carried by said other part of said lever assembly, the other end of said separate cable extending through said anchor element, said other cable end engaging said anchor element as said other lever part moves to a position corresponding to an advanced engine throttle position whereby said ratio-controlling elements are displaced upon further depression of said accelerator pedal beyond said advanced throttle position.

4. The combination as set forth in claim 2 including a yieldable spring connection between one end of said last-named separated cable and said ratio-controlling elements, an anchor element carried by said other part of said lever assembly, the other end of said separate cable extending through said anchor element, said other cable and engaging said anchor element as said other lever part moves to a position corresponding to an advanced engine throttle position whereby said controlling elements are displaced upon further depression of said accelerator pedal beyond said advanced throttle position.

5. The combination as set forth in claim 1 including bracket structure for securing said last mentioned separate cable to a stationary portion of said transmission mechanism, said ratio-controlling elements being journalled on said stationary portion, the downshift point with respect to accelerator pedal movement thereby being determined by the tolerance in the dimension between the bracket structure for said cable and the associated cable end.

6. The combination as set forth in claim 2 including bracket structure for securing said last mentioned separate cable to a stationary portion of said transmission mechanism, said ratio-controlling elements being journalled on said stationary portion, the downshift point with respct to accelerator pedal movement thereby being determined by the tolerance in the dimension between the bracket structure for said cable and the associated cable end.

7. The combination as set forth in claim 3 including bracket structure for securing said last mentioned separate cable to a stationary portion of said transmission mechanism, said ratio-controlling elements being journalled on said stationary transmission portion, the downshift point with respect to accelerator pedal movement thereby being determined by the tolerance in the dimension between the bracket structure for said cable and the associated cable end.

8. The combination as set forth in claim 4 including bracket structure for securing said last mentioned separate cable to a stationary portion of said transmission mechanism, said ratio-controlling elements being journalled on said stationary transmission portion, the downshift point with respect to accelerator pedal movement thereby being determined by the tolerance in the dimension between the bracket structure for said cable and the associated cable end.

References Cited

UNITED STATES PATENTS

| | | | |
|---|---|---|---|
| 2,670,064 | 2/1954 | Hasbany | 192—4 |
| 2,770,326 | 11/1956 | Wayman | 192—4 |
| 2,823,555 | 2/1958 | Cislo | 74—877 |
| 2,870,649 | 1/1959 | Zemke | 74—877 |
| 3,034,373 | 5/1962 | Walker | 74—877 |
| 3,308,678 | 3/1967 | Walker | 74—843 |
| 3,361,234 | 1/1968 | Runyon | 192—4 |

FOREIGN PATENTS 1,094,113  1/1960  Germany.

ARTHUR T. McKEON, Primary Examiner

U.S. Cl. X.R.

74—513, 843

UNITED STATES PATENT OFFICE
CERTIFICATE OF CORRECTION

Patent No. 3,498,156                    Dated  March 3, 1970

Inventor(s)            M. McAllister et al

It is certified that error appears in the above-identified patent and that said Letters Patent are hereby corrected as shown below:

Column 3, line 33, cancel "52" and substitute --58--; line 36, cancel "52" and substitute --58--.

Column 5, line 43, cancel "other" and substitute --one--; line 46, cancel "other" and substitute --one--; line 54, cancel "other" and substitute --one--; line 57, cancel "other" and substitute --one--.

Signed and sealed this 26th day of October 1971.

(SEAL)
Attest:

EDWARD M. FLETCHER, JR.
Attesting Officer

ROBERT GOTTSCHALK
Acting Commissioner of Patents